United States Patent [19]
Seguchi et al.

[11] Patent Number: 5,604,609
[45] Date of Patent: Feb. 18, 1997

[54] LIGHT REFLECTION TYPE DETECTION DEVICE IN FACSIMILE MACHINE

[75] Inventors: Katsutoshi Seguchi, Aichi-ken; Yoshikatsu Kameyama, Gifu-ken; Yasuhito Bandai, Nagoya; Tomohisa Higuchi, Nagoya; Hiroaki Yazawa, Nagoya; Makoto Yamada, Gifu, all of Japan

[73] Assignee: Brother Kogyo Kabushiki Kaisha, Nagoya, Japan

[21] Appl. No.: 329,474

[22] Filed: Oct. 26, 1994

[30]        Foreign Application Priority Data

Nov. 1, 1993   [JP]   Japan ................................ 5-297255
Nov. 15, 1993  [JP]   Japan ................................ 5-284708

[51] Int. Cl.⁶ ........................................................ H04N 1/04
[52] U.S. Cl. ............................................... 358/488; 358/492
[58] Field of Search ........................................ 358/498, 497, 358/496, 492, 494, 488, 400, 401, 480, 449, 296, 298; 271/245, 246, 253, 254, 8.1

[56]               References Cited

U.S. PATENT DOCUMENTS

| | | | |
|---|---|---|---|
| 4,751,582 | 6/1988 | Koseki et al. | 358/443 |
| 4,872,061 | 10/1989 | Uchiyama | 358/400 |
| 4,989,237 | 1/1991 | Kotani | 358/498 |
| 5,014,135 | 5/1991 | Ijuin et al. | 358/498 |
| 5,077,614 | 12/1991 | Stemmle | 358/296 |

*Primary Examiner*—Edward L. Coles, Sr.
*Assistant Examiner*—Jerome Grant, II
*Attorney, Agent, or Firm*—Oliff & Berridge

[57]                ABSTRACT

A facsimile machine has various detection devices. One of the detection device detects a sheet medium. The detection device includes a reflection type sensor directly mounted on a control board. An actuator is pivotally movably supported in a main frame of the facsimile machine. The actuator has a pivot shaft portion, a first arm and a second arm those extending from the pivot shaft portion. A free end of the first arm is abuttable on the sheet medium. If sheet medium is transferred to a predetermined portion, an edge of the sheet urges the free end to angularly rotate the actuator. A free end of the second arm is provided with a reflection member. The angular movement of the actuator causes the reflection member to be brought into confrontation with the reflection type sensor so as to detect passage of the sheet medium. A regulation member is integrally provided to the reflection member. The regulation member is brought into contact with the control board because of the gravity of the actuator, so that a given distance is provided between the reflection member and the reflection type sensor in the confronting state therebetween. The other sensor device may detects moving phase of a movable member. To this effect, the free end of the first arm is abuttable on the movable member.

17 Claims, 9 Drawing Sheets

LIGHT REFLECTION TYPE DETECTION DEVICE IN FACSIMILE MACHINE

BACKGROUND OF THE INVENTION

The present invention relates to a detection device for use in an image forming apparatus such as a facsimile machine, and more particularly, to the detection device in which a light reflection type sensor is mounted on a control board, and capable of detecting transportation of a sheet medium or capable of detecting moving or operating phase of various movable segments used in the image forming apparatus.

In an image forming apparatus, various detection devices are provided. One of the detection devices detects existence of a sheet medium such as an original sheet which carries an original image and a printing sheet on which the original image is to be copied. Another detection device is adapted to detect passage of the sheet medium, and still another detection device is adapted to detect operating phase of a movable member such as an arm, a cover, etc. As such detection devices, available are a microswitch, a proximity switch which detects a moving phase of an actuator, photo-switch having a photo-interrupter, and a reflection type sensor.

The reflection type sensor includes a light emitting portion and a light receiving portion. Further, an actuator having a reflection plate is provided. The actuator is movable toward and away from the reflection type sensor in response to the passage of the sheet medium or in response to the movement of a movable member in the image forming apparatus.

If the sheet medium or the movable member reaches a predetermined area, an actuator reaches a predetermined region in the vicinity of the reflection type sensor so that the light from the light emitting portion can be impinged on the reflection plate and reflected toward the light receiving portion in order to detect the movable member or the sheet medium. Further, a board exclusively connected to the reflection type sensor is connected to a control board via a harness for processing signals from the reflection type sensor.

However, in the conventional detection device using the reflection type sensor, the actuator may provide relatively large moving stroke, and is required accurate positioning between the reflection type sensor and the actuator, when the latter is moved to a close position of the sensor, otherwise erroneous detection results. In order to avoid this drawback, high dimensional accuracy and accurate assembly work are required, which however, raises production cost of an entire image forming apparatus.

The photointerrupter can be used as the detection device instead of the reflection type sensor. However the photointerrupter is rather expensive and it would be rather difficult to form a slit.

In another aspect, a conventional facsimile machine includes a main frame having an upper open end and a cover member adapted to open or close the upper open end. The cover member includes a recording sheet cover for opening and closing an upper open end of a recording sheet accommodating portion and a panel cover for covering an operation panel. A detection device is provided for detecting open state of the recording sheet cover so as to prevent the facsimile machine from being operated with the recording sheet cover being open. Further a second detection device is provided for detecting open state of the panel cover to prevent the facsimile machine from being operated with the panel cover being open.

The second detection device in addition to the first detection device increases mechanical parts and production cost. However, the second detection device is an essential mechanism for checking white color level in an original reading process. More specifically, in the facsimile machine, white color level check data are used for checking white color level to determine threshold level so as to binarize image data obtained through reading an original image. The white color level check data are not permanently stored in an EEPOM but is stored in an economical RAM, so that white color level checking can be performed each time the original image is read. In the latter case, the panel cover must be closed during the white color level checking, otherwise the ambient light may be trapped in the checking. Still however, the mechanism for detecting opening phase of the panel cover should be dispensed with in terms of production cost.

SUMMARY OF THE INVENTION

It is therefore, an object of the present invention to provide a detection device for use in an image forming apparatus, the detection device being capable of providing an accurate positioning between an actuator and a reflection type sensor for accurate detection without high requirement of dimensional accuracy nor assemblage accuracy.

Another object of the present invention is to provide such a detection device having a simplified mechanism for detecting opening phase of a recording sheet cover and a panel cover.

These and other object of the present invention will be attained by providing a detection device for detecting a state or a phase of an article to be detected in an image forming apparatus having a main frame, the detection device including a reflection type sensor, a control board, an actuator, a reflection member and a regulation member. The reflection type sensor has a light emitting portion and a light receiving portion and generates a detection signal upon receiving light in the light receiving portion. The control board has control elements into which the detection signal is input. The actuator is movably supported by the main frame and having one end abuttable against the article to be detected and having another end. The movement of the actuator is determinative by the abutment of the one end against the article. The reflection member is provided at the other end of the actuator. The reflection member is movable toward and away from the reflection type sensor in accordance with the movement of the actuator. The regulation member is provided for providing a regulated distance between the reflection member and the reflection type sensor when the reflection member is moved to the vicinity of the reflection type sensor.

In another aspect of the invention, there is provided an image forming apparatus including a main frame defining an original sheet path, an original sheet feeding mechanism comprising an original sheet feed roller, a detection device provided in the main frame for detecting the original sheet when the original sheet runs on the original sheet path. The detection device includes a reflection type sensor having a light emitting portion and a light receiving portion, the sensor generating a detection signal upon receiving light in the light receiving portion, a control board having control elements into which the detection signal is input, an actuator movably supported by the main frame and having one end abuttable against the original sheet and having another end, the movement of the actuator being determinative by the abutment of the one end against the original sheet, a reflection member provided at the other end of the actuator, the reflection member being movable toward and away from the reflection type sensor in accordance with the movement of the actuator, and a regulation member for providing a regulated distance between the reflection member and the reflection type sensor when the reflection member is moved to the vicinity of the reflection type sensor.

In still another aspect of the present invention, there is provided an image forming apparatus including a main frame having an upper opening, a recording sheet cover provided at a rear half portion of the upper opening for opening and closing the rear half portion, a panel cover provided at a front half portion of the upper opening for opening and closing the front half portion, detection device provided in the main frame for detecting opening state of the recording sheet cover, and an interlocking mechanism provided between the panel cover and the recording sheet cover for slightly opening the recording sheet cover from a closing state thereof in response to opening movement of the panel cover from closing state thereof.

DETAILED DESCRIPTION OF THE PREFERRED EMBODIMENTS

An image forming apparatus according to one embodiment of the present invention will be described with reference to FIGS. 1 through 8. Throughout the specification, the expressions "front", "rear", "above", "below" and "laterally", are used herein to define the various parts when the facsimile machine F is disposed in an orientation in which it is intended to be used. The illustrated embodiment pertains to a facsimile machine F.

Figure 1:
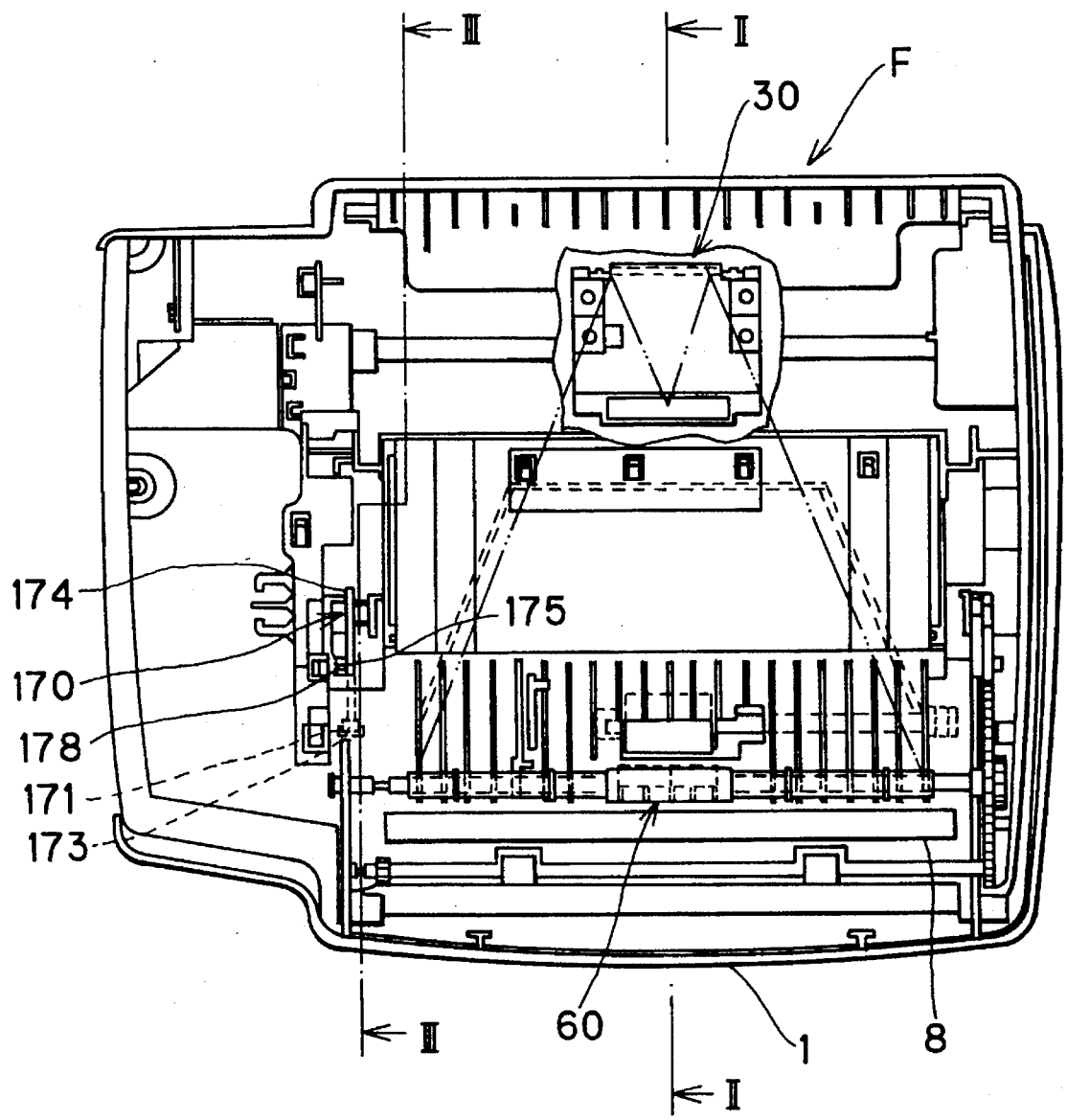
FIG. 1 is a plan view showing an essential portion of a facsimile machine according to one embodiment of the present invention.
Figure 2:
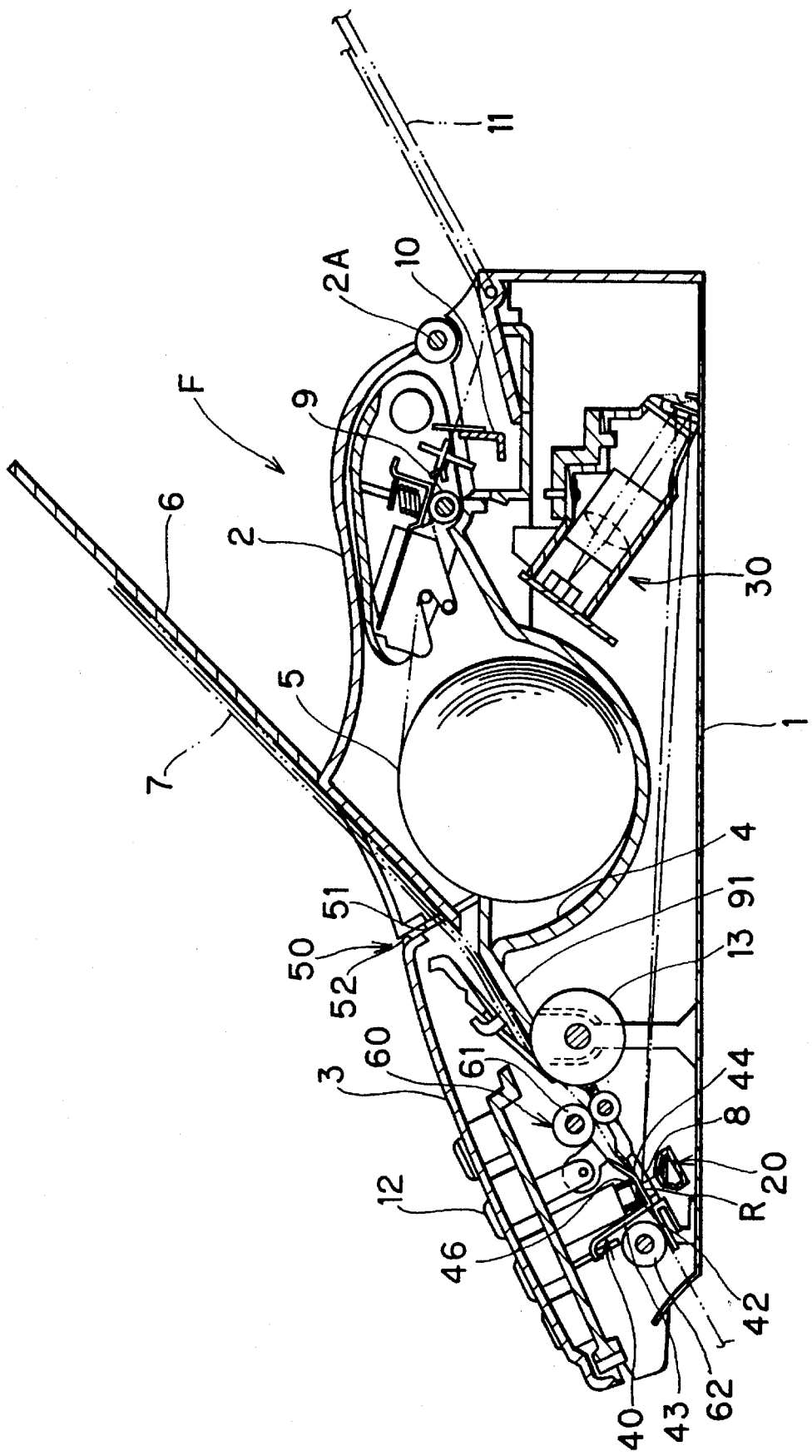
FIG. 2 is a cross-sectional side view of the facsimile machine taken along the line II—II of FIG. 1.

As shown in FIGS. 1 and 2, the facsimile machine F includes a main frame 1 having upper rear portion to which a recording sheet cover 2 is pivotally movably provided to close and open an upper rear opening. The main frame 1 also has a front upper portion to which a panel cover 3 is pivotally movably provided to close and open the front upper portion. A recording sheet accommodating portion 4 is provided in the main frame 1 for accommodating a rolled heat sensitive recording sheet 5. An original stack tray 6 is provided for setting a stack of original image sheets 7, and a separation roller 13 is rotatably provided for separating one of the original image sheets 7 from the sheet stack.

An original chute wall 91 is provided in the main frame for receiving the separated original sheet 7, and an original image sheet feed mechanism 60 is provided in the main frame 1 at downstream of the separation roller 13. The sheet feed mechanism 60 is adapted to feed the original image sheet 7 to an image reading zone R and includes a original sheet supply roller 61 and a original sheet discharge roller 62 driven by a drive motor (not shown) and a gear transmission mechanism (not shown).

Further, a light emitting unit 20 and a light receiving unit 30 having a reflection mirror are provided in the main frame 1 for reading the original image carried on the original sheet 7. At the image reading zone R, there are provided a transparent glass plate 8 for supporting the original image sheet 7 with an imaging surface facing down, and original image sheet pressing mechanism 40 for pressing the original image sheet 7 onto the glass plate 8.

Further, a thermal head 9 is provided in the main frame 1 for printing images to the recording sheet 5. Moreover, there are provided a cutter 10 for cutting the recording sheet 5 after printing, a recording sheet receiving tray 11 for receiving a cut recording sheet 5, an operation panel 12 provided on the panel cover 3, and a control unit (not shown) assembled into the main frame 1.

Figure 3:
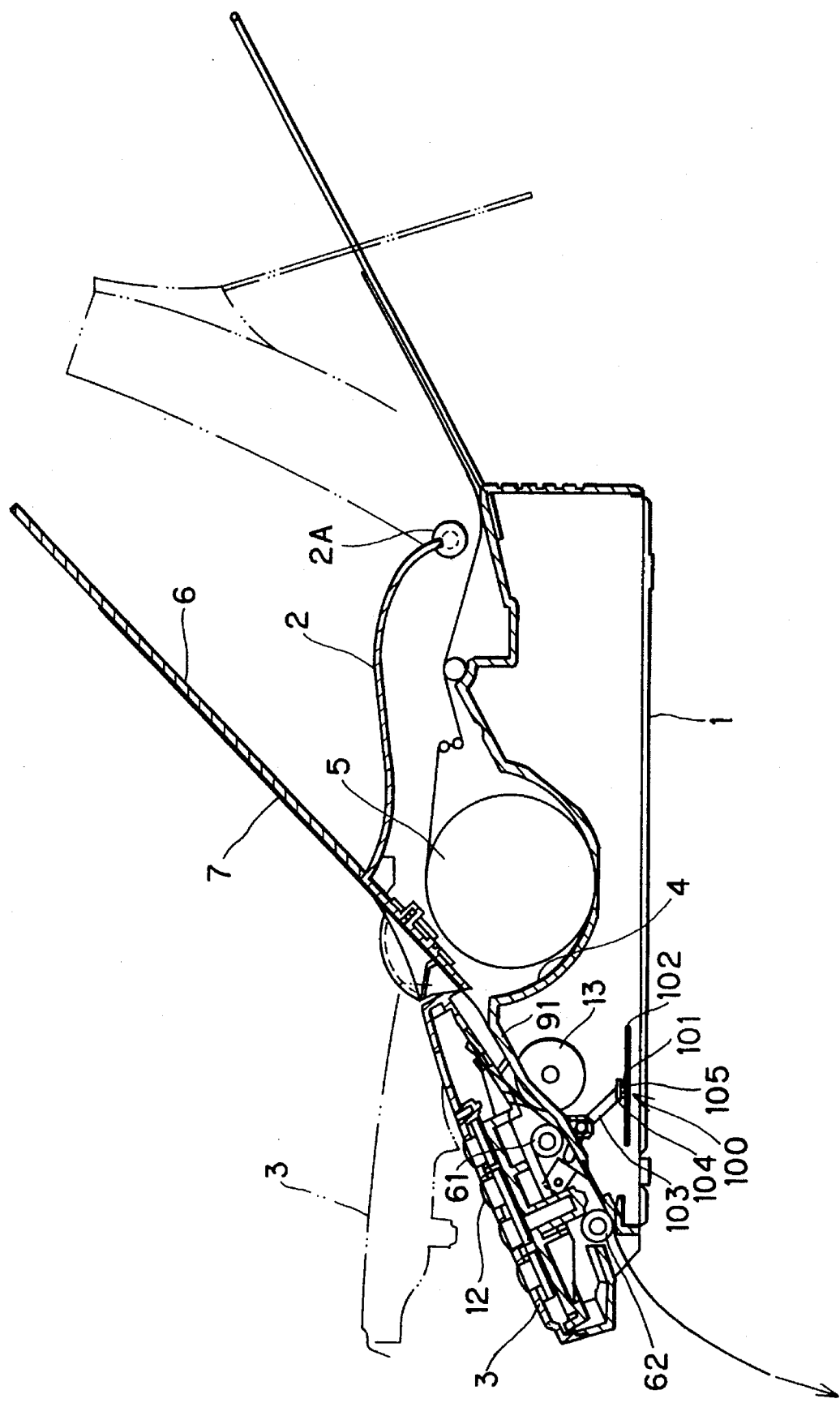
FIG. 3 is a cross-sectional side view of the facsimile machine taken along the line III—III of FIG. 1 for particularly showing a detection device for detecting passage of an original sheet along a path of the original sheet fed by a sheet feed mechanism.
Figure 4:
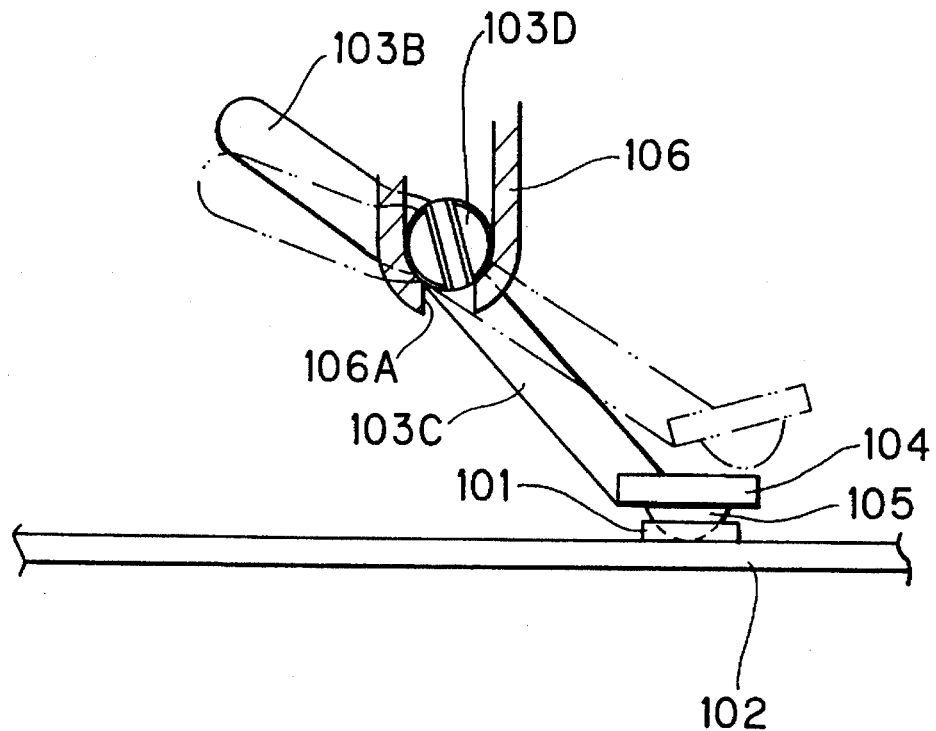
FIG. 4 is an enlarged cross-sectional side view showing the sheet detection device for detecting passage of the original sheet along the original sheet feed path.
Figure 5:
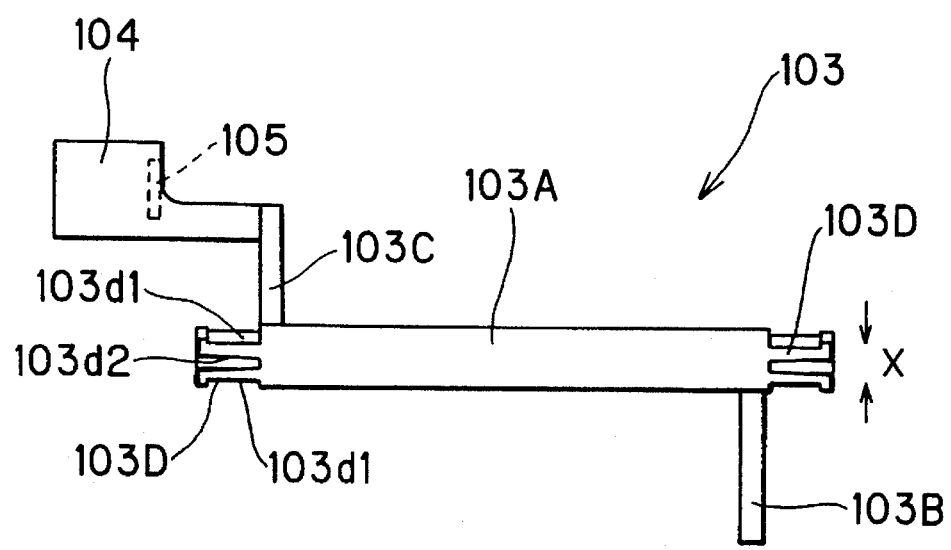
FIG. 5 is a top plan view showing an actuator used in the sheet detection device shown in FIGS. 3 and 4.

As shown in FIGS. 3 through 5, at a position adjacent the original sheet path on the original chute wall 91, an original sheet detection device 100 is provided for detecting the original sheet 7. The detection device 100 is adapted to detect a rear edge of the original sheet 7 and generate a detection signal so as to set the original sheet 7 at a reference position by the sheet feed mechanism 60 for starting a copying operation onto the image recording sheet 5 upon elapse of time period from the detection timing.

The detection device 100 includes a reflection type sensor 101, a control board 102, an actuator 103, a reflection plate 104, and a regulation member 105. The reflection type sensor 101 includes a light emitting portion and a light receiving portion. The sensor 101 is adapted to generate a detection signal when the light receiving portion receives a reflected light. The reflection type sensor 101 is directly mounted on the control board 102. The control board 102 includes control elements to which the detection signals transmitted from the reflection type sensor 101 is inputted for data processing.

The actuator arm 103 is angularly movably supported by a pair of attachment members 106 suspended from the original sheet chute wall 91. Each attachment member 106 has a lip portion 106a at its bottom portion. The lip portion 106a can be resiliently expandable to enlarge the lip open space. The actuator 103 is formed of a resin material. As best shown in FIG. 5, the actuator 103 includes a shaft portion 103A having axially end portions 103D, a first arm 103B radially extending from the shaft portion 103A, and a second arm 103C radially extending from the shaft portion 103A. An angle defined between the first and second arms 103B and 103C is almost 180 degrees. A free end of the second arm 103C is provided with the reflection plate 104 which can reflect light emitted from the light emitting portion of the reflection type sensor 101. Further, the regulation member 105 extends from the reflection plate 104.

Each axially end portion 103D is formed with external cut-out 103d1 and an inner groove 103d2 to form a U-shaped end, so that the confronting walls of the "U" can be easily deformable upon pressure in a direction indicated by an arrow X. Upon deformation, the U-shaped end 103D is insertable through the lip portion 106a, whereupon the actuator 103 is angularly movably suspended by the attachment members 106 when restoring the original shape of the U-shaped ends 103D. In this state, a free end of the first arm 103B is positioned on the original sheet path. That is, the free end of the first arm 103B is abuttable on the original sheet 7, so that the actuator 103 can be angularly movable as shown by a dotted line in FIG. 4 by the running original sheet 7.

As shown in FIG. 4, the regulation member 105 extends downwardly from the reflection plate 104, and has a rounded end or tip which is contactable with the top surface of the control board 102 when the actuator 103 is in a rest position. The reflection plate 104 can be positioned close to and in confrontation with the reflection type sensor 101 by the gravity as shown by a solid line in FIG. 4. In this case, a distance between the reflection type sensor 101 and the reflection plate 104 can be defined by an extension length of the regulation member 105. Thus, constant distance can be provided because of the surface contact between the regulation member 105 and the control board 102. This structure can absorb dimensional inaccuracy of the components and can also absorb inaccuracy of assembly of these components. Accordingly, stabilized detection, that is, stabilized light reflection at the reflection plate 104 and stabilized light reception at the light receiving portion can result.

Incidentally, the control board 102 can serve as a prevention member for preventing the actuator 103 from being disengaged from the attachment member 106. That is, if the external cut outs 103d1 of the U-shaped ends are aligned with the lip portion 106A, the U-shaped ends may accidentally be dropped from the attachment member 106 through the lip portion 106A. In this connection, a thickness of the control board 102 can provide a proper inclination of the actuator 103 so as to avoid such alignment.

The recording sheet cover 2 has a rear end portion provided with a pivot portion 13 rotatably supported by a support portion 14 provided at a rear end portion of the main frame 1. That is, the pivot portion 13 has a pair of laterally extending pins inserted into a hole 17 of the support portion 14. Thus, the recording sheet cover 2 is angularly movably provided to the main frame 1.

Figure 11:
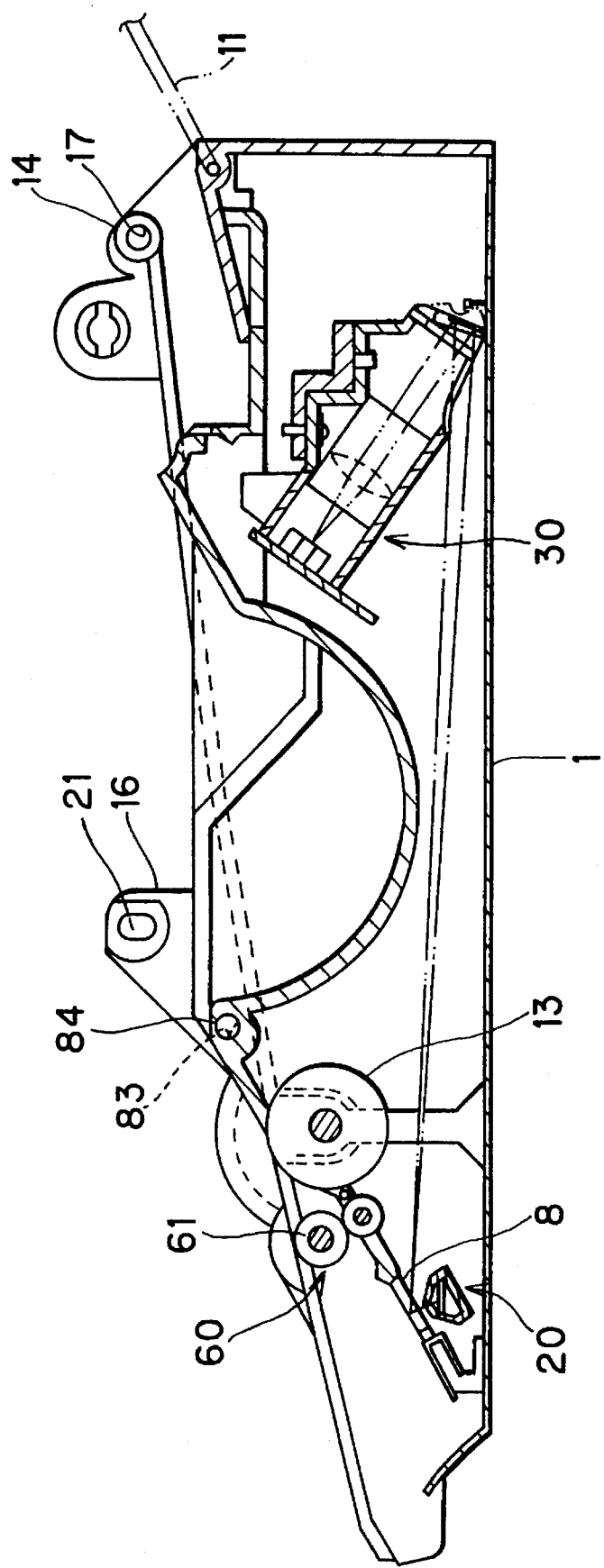
FIG. 11 is a cross-sectional side view showing a main frame of the facsimile machine according to the embodiment of this invention.

A rear end portion of the panel cover 3 is positioned adjacent the recording sheet cover 2, and has a pivot portion 15 rotatably supported by a support portion 16 (see FIG. 11) upstanding from the main frame 1 at a position approximately central portion thereof in a frontward/rearward direction of the main frame 1. The pivot portion 15 is provided by a pivot piece 18 extending rearwardly form the rear end portion of the panel cover 3. The pivot piece 18 is formed with a generally circular groove 19 with which a cylindrical projection 21 provided at the support portion 16 is engageable. Thus, the panel cover 2 is angularly movably provided to the main frame 1. These recording sheet cover 2 and the panel cover 3 can be opened substantially synchronously by an interlocking mechanism 50 provided at a position adjacent to both the recording sheet cover 2 and the panel cover 3.

The interlocking mechanism 50 includes an engagement portion 52 and a driven portion 51. The engagement portion 52 is provided at a rear end portion of the panel cover 3 and is shaped to urge the driven portions 51 upwardly when the panel cover 3 is opened. Each engagement portion 52 is provided at lateral side of the panel cover 3. The driven portion 51 is provided at a front end portion of and lateral side of the recording sheet cover 2 at a position in confrontation with corresponding engagement portion.

Figure 8:
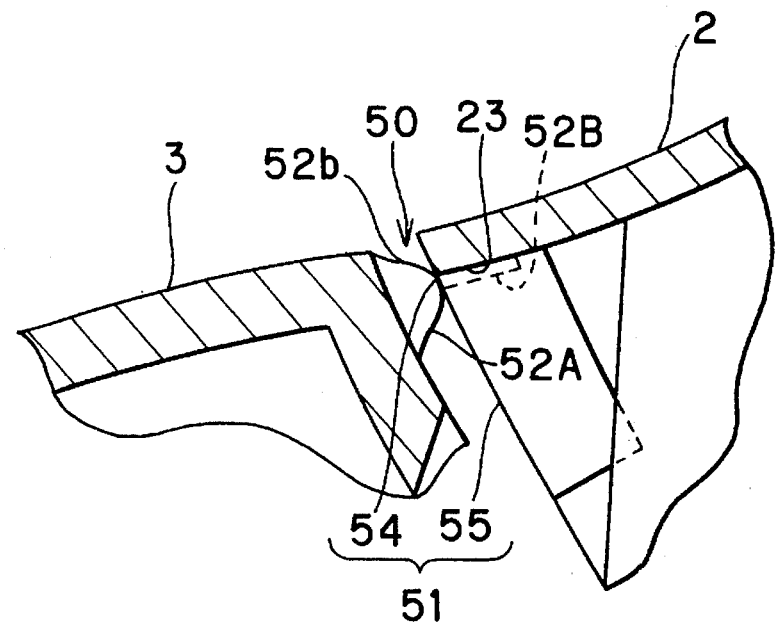
FIG. 8 is a partially enlarged cross-sectional view showing an interlocking mechanism and showing closing state of the panel cover and the recording sheet cover according to the embodiment of this invention.
Figure 9:
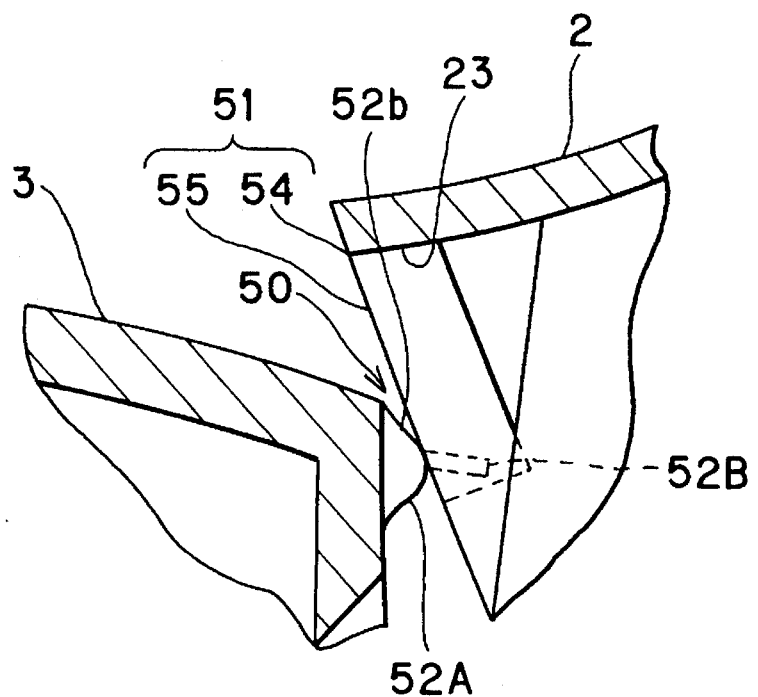
FIG. 9 is a partially enlarged cross-sectional view showing the interlocking mechanism and showing open state of the panel cover and the recording sheet cover according to the embodiment of this invention.

The engagement portion 52 includes a first pair of engagement projections 52A and a second pair of engagement projections 52B. Each of the first pair of engagement projections 52A extends from the rear end face of the panel cover 3 and has a triangular shape whose apex is directed rearwardly toward the recording sheet cover 2 as shown in FIGS. 8 and 9. The second pair of engagement projections 52B has an elongated shape and extends from the rear end face of the panel cover 3 and at a position laterally beside the first engagement projections 52A. Each base portion 25 of each second engagement projections 52B has upper surface 25b which is flush with each upper surface of the first triangular engagement projection 52A in such a manner that the upper surfaces are slanted downwardly toward the recording sheet cover 2.

Figure 10:
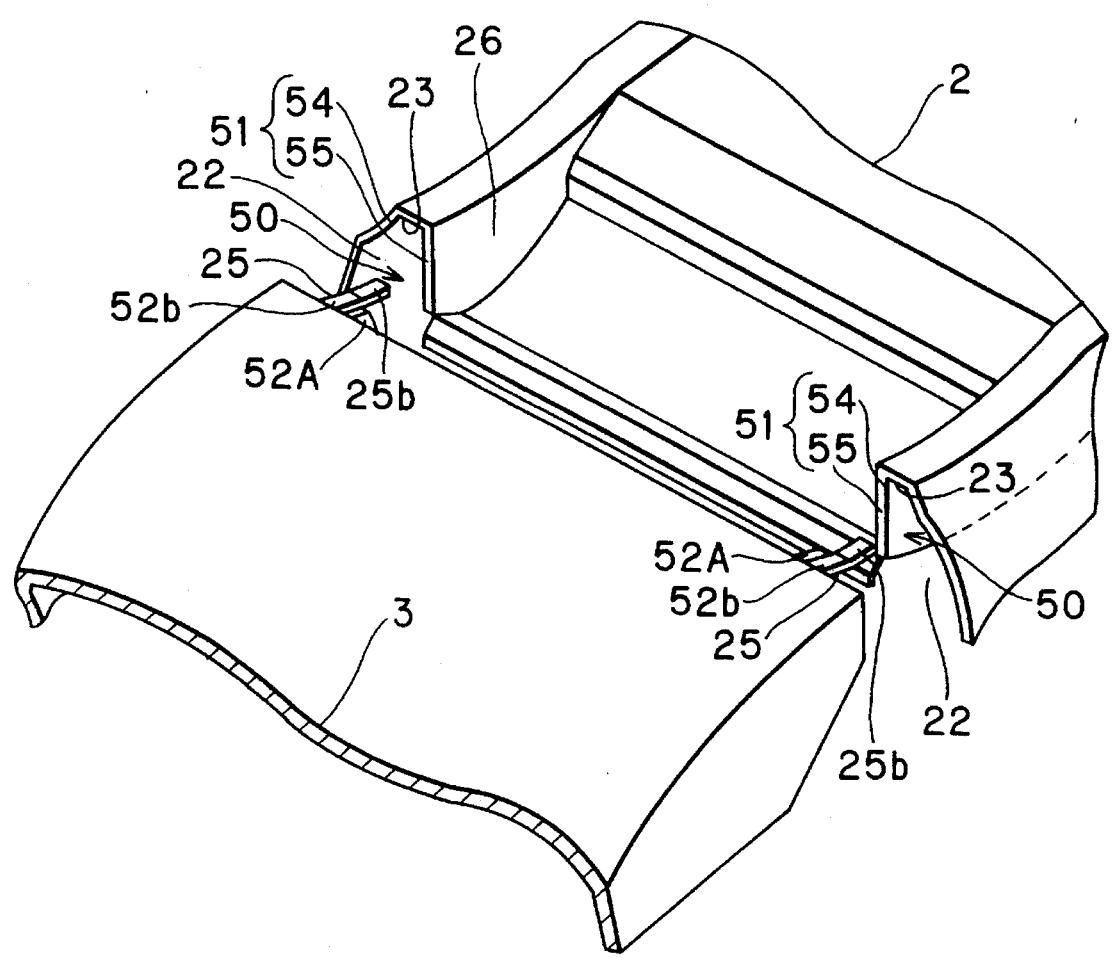
FIG. 10 is a perspective view showing essential portions of the panel cover and the recording sheet cover according to the embodiment of this invention.

As shown in FIG. 10, a forward portion of the recording sheet cover 2 has lateral sides where inverted U-shaped walls 26 are provided. The inverted U-shaped walls 26 define therein spaces 22. The driven portion 51 includes a first pair of driven portions or surfaces 55 provided at front end face of the inverted U-shaped walls and a second pair of driven portions or lines 54 provided at a front edge of lower faces 23 of top walls of the inverted U-shaped walls. Each first pair of engagement projections 52A is engageable with each first pair of driven surfaces 55, and each second pair of engagement projections 52B is engageably positioned in the space 22 of the inverted U-shaped walls 26.

When the panel cover 2 is opened, the upper surfaces 25b at the base portions 25 of the second engagement projections 52B press the second pair of driven portions 54 provided at the front edge of the lower faces 23, so that the recording sheet cover 2 is slightly opened. Then, the first pair of engagement projections 52A press the first driven surfaces 55 downwardly, so that the first driven surfaces 55 are urgedly moved upwardly along the slanted surface of the first pair of engagement projections 52A. Accordingly, the recording sheet cover 2 and the panel cover 3 are interlockingly opened.

At a position below the confronting portion between the recording sheet cover 2 and the panel cover 3, another detection device 170 is provided for detecting opening state of these covers 2 and 3. The detection device 170 includes a reflection type sensor 171 having a light emitting portion and light receiving portion, an operation piece 172 fixed to the recording sheet cover 2, and a movable member or actuator 174 provided to the main frame 1 and pivotally movable in response to the movement of the operation piece 172. The reflection type sensor 171 is provided on the control board 102 in the same way as the sensor 101 and the control board 102 shown in FIG. 4.

The actuator 174 is of an elongated and bent shape and has upper arm 177 and a lower arm 176. A lower end portion of the lower arm 176 is provided with a detected portion or reflection plate 173 to be detected by the reflection type sensor 171, the detected portion extending in a horizontal direction. The actuator 174 has an intermediate portion provided with a pivot portion 175 extending horizontally therefrom and rotatably supported in a support bore portion 178 formed at an upper left portion of the main frame 1 as shown in FIG. 1. Thus, the actuator 174 is pivotally movable about the pivot portion 175. The lower arm 176 is made longer than the upper arm 177. Because of the weight of the lower arm 176, the actuator 174 normally has a vertically extending posture.

The above described reflection type sensor 171 is positioned immediately below the detected portion 173 provided that the actuator 174 has a vertically extending posture. The operation piece 172 is suspended from the front portion of the recording sheet cover 2. The lower face of the operation piece 172 is adapted to press the upper arm 177 downwardly when the recording sheet cover 2 is closed. The detected portion 173 is provided with a regulation member 179 contactable with the control board similar to the regulation member 105 shown in FIGS. 4 and 5.

Figure 6:
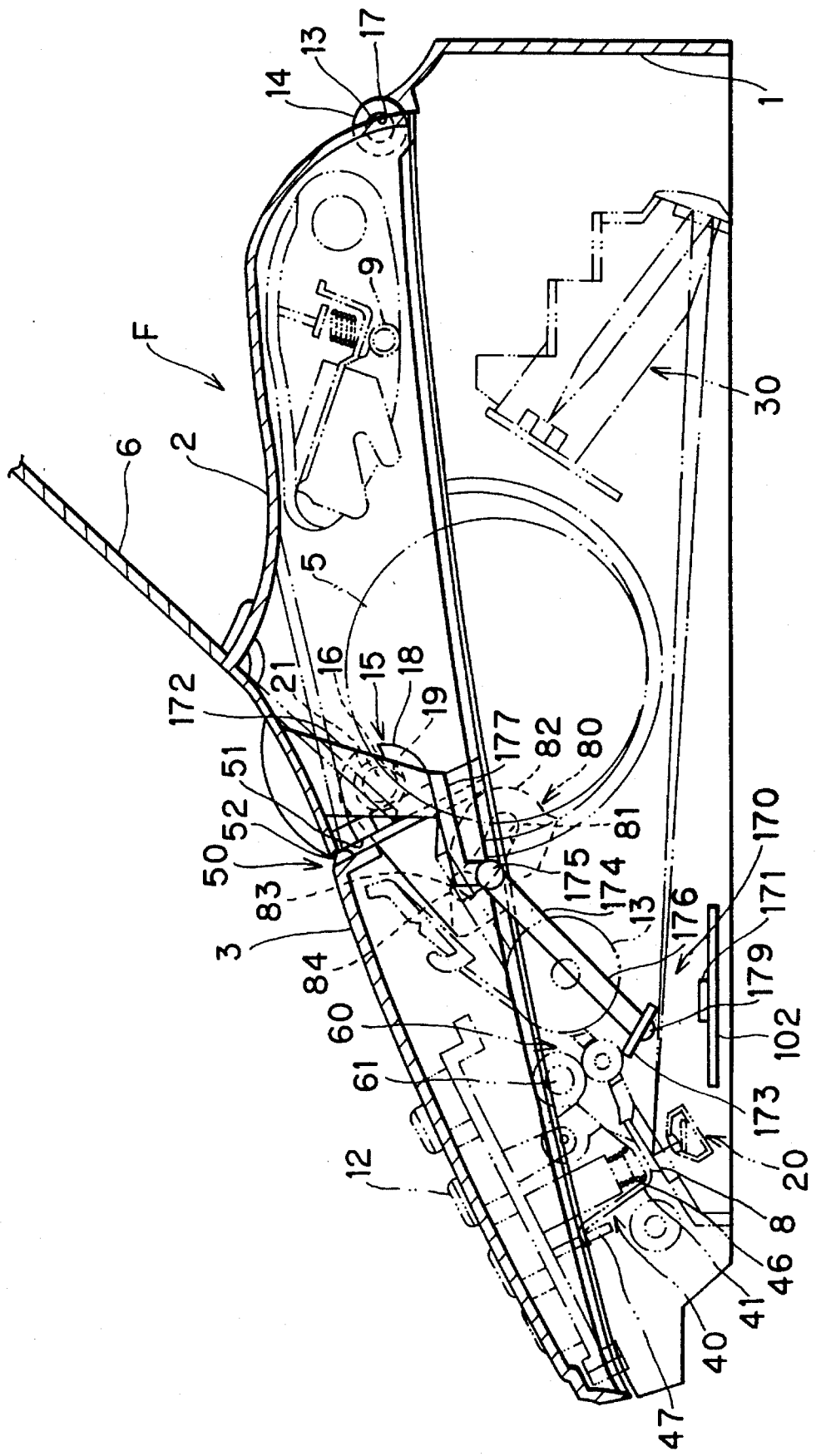
FIG. 6 is a cross-sectional side view showing a closing state of a panel cover and a recording sheet cover in the facsimile machine.

As shown in FIG. 6, if the panel cover 3 and the recording sheet cover 2 are closed, the operation piece 172 fixed to the recording sheet cover 2 presses the upper arm 177 of the actuator 174, so that the actuator 174 is pivotally moved about the pivot portion 175 in a clockwise direction in FIG. 6. Thus, the lower arm 176 is lifted, and the actuator 174 has a substantially horizontally extending posture. Accordingly, the reflection type sensor 171 does not detect the detected portion 173 fixed to the actuator 174.

Figure 7:
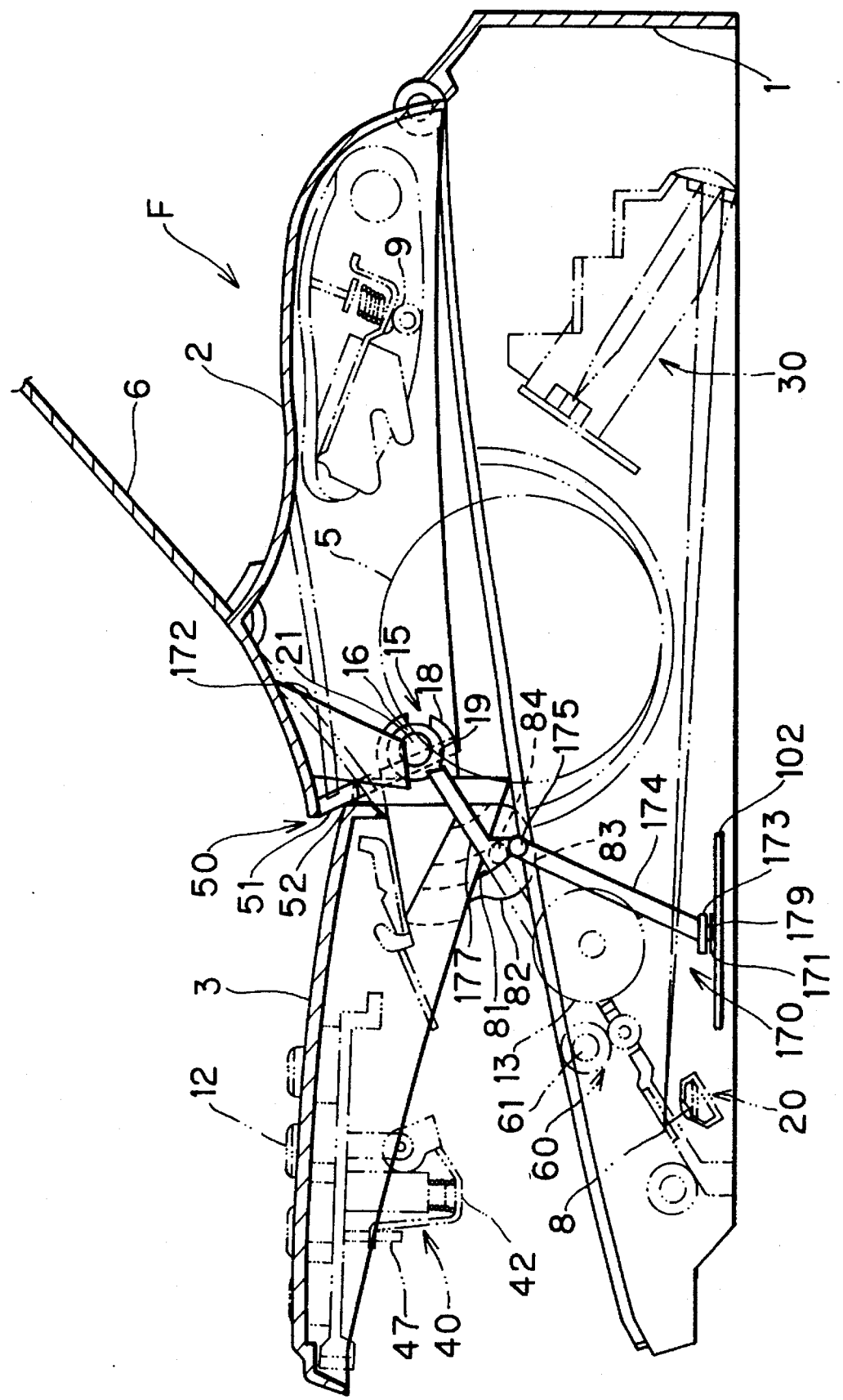
FIG. 7 is a cross-sectional side view showing open state of a panel cover and a recording sheet cover in the facsimile machine.

On the other hand, as shown in FIG. 7, if the panel cover 3 is opened, the recording sheet cover 2 is interlockingly slightly opened. Therefore, the operation piece 172 is moved away from the upper arm 177. Thus, the actuator 174 is free from the operation piece 172. Accordingly, the actuator 174 has a vertically extending posture because of own weight of the lower arm 176. Consequently, the detected portion 173 fixed to the actuator 174 is brought to a position immediately above the reflection type sensor 171, so that the latter detects the detected portion 173, which is indicative of opening the panel cover 3 and the recoding sheet cover 2.

An open/closure guide mechanism 80 is also provided as shown in FIGS. 6 and 7. The guide mechanism 80 includes a guide plate 82 and a pin member 84. The guide plate 82 is fixed to a rear lower portion of the panel cover 3 and is formed with an arcuate guide groove 81. The pin member 84 is fixed to the main frame 1 and has a circular cross-section with a part being cut away to provide a sliding surface 83 slidable on the arcuate groove 81.

Because of the engagement of the sliding surface 83 of the pin member 84 with the guide groove 81 of the guide plate 82, the arcuate groove wall 81 is slidingly moved on the sliding surface 83 of the pin member 84 when the panel cover 3 is opened or closed, i.e., the panel cover 3 is moved with the guidance of the guide mechanism 80. If a new roll of the recording sheet 5 is to be supplemented, the recording sheet cover 2 is opened while the panel cover 3 is closed.

An original holding mechanism 40 will next be described. As shown in FIGS. 2, 6 and 7, the original holding mechanism 40 includes an original retainer 41, a support mechanism 47, and a four compression coil springs 46. The original retainer 41 is supported to the panel cover 3 by the support mechanism 47. The support mechanism 47 supports the original retainer 41 in parallel with the glass plate 8 and allows the retainer 41 to be movable toward and away from the glass plate 8. The original retainer 41 is made of a thin metal plate having a lower portion provided with a bottom plate portion 42 coated with a white color paint for white color level checking. The bottom plate portion 42 is adapted to press the original 7 onto the glass plate 8. A smoothly planed board 43 extends from the front end portion of the bottom plate portion 42, and a guide plate portion 44 integrally extends from the rear end portion of the bottom plate portion 42. Further, a pair of support segments extend from lateral sides of the guide plate portion 44. The four compression coil springs 46 are adapted to press the original retainer 41 onto the glass plate 8.

In operation, the panel cover 3 and the recording sheet cover 2 are initially closed as shown in FIG. 6. If the original sheet 7 is fed along the original sheet path by the original sheet feed roller 61, the leading end of the original sheet 7 abuts the free end of the first arm 103B of the actuator 103, so that the actuator 103 is angularly moved about an axis of the shaft 103A. Accordingly, the reflection plate 104 is moved away from the reflection type sensor 101. Consequently, detection to the original sheet 7 is performed.

If the trailing end of the original sheet 7 is moved past the free end of the first arm 103B, the actuator 103 is angularly moved in a reverse direction by its gravity, so that the reflection plate 104 can be moved to a position close to and in confrontation with the reflection type sensor 101. Thus, detection to the passage of the original sheet 7 is performed. In this case, since the positional relationship between the reflection plate 104 and the reflection type sensor 101 is defined constant by the regulation member 105, stabilized detection results.

If the panel cover 3 is opened as shown in FIG. 7, the slanted upper surfaces 25b at the base portions 25 of the second engagement projections 52B press upwardly the second pair of driven lines 54 provided at the front edge of the lower faces 23, so that the recording sheet cover 2 is slightly opened. Then, the first pair of engagement projections 52A press the first driven surfaces 55 downwardly, so that the first driven surfaces 55 are urgedly moved upwardly along the slanted surface of the first pair of engagement projections 52A. Accordingly, the recording sheet cover 2 and the panel cover 3 are interlockingly opened. In this instance, the operation piece 172 fixed to the recording sheet cover 2 is moved away from the upper portion of the actuator 174. Accordingly, the actuator 174 is angularly moved to have a generally vertically oriented posture because of own weight of the lower arm portion 176. Consequently, the detected portion 173 provided at the lower end portion of the actuator 174 is brought to a position immediately above the reflection type sensor 171. In this case, the positional relationship between the reflection type sensor 171 and the detected portion 173 can be maintained constant because of the surface contact of the regulation member 178 with the control board 102. Thus, the detected portion 173 can be surely detected by the sensor 171 to display or alarm open state of the covers 2 and 3.

In this way, an operator can acknowledge the open state of the panel cover 2 and the recording sheet cover 3. Therefore, the operator can refrain from operation of the facsimile machine F. Further, white color level checking is performed while the panel cover 3 is closed, whereby white color level check data are stored in an inexpensive RAM. The white color level checking is not performed by a proper program control if the reflection type sensor 171 detects open state of the panel cover 3 and the recording sheet cover 2. In other words, external or ambient light such as a light from a fluorescent lamp is not entered into the white color level checking portion, and therefore, accurate white color level checking is achievable.

According to the above described embodiment, since the regulation member is provided between the reflection plate and the control board, a distance between the reflection plate and the reflection type sensor can be constantly maintained when the actuator is moved toward the reflection type sensor. This arrangement can absorb dimensional inaccuracy of the components, and assembling inaccuracy thereof. Further, a minute geometrical displacement between the reflection plate and the reflection type sensor can be tolerated by enlarging the size of the reflection plate. Furthermore, because of the employment of the reflection type sensor rather than the photointerrupter, economical detection device results.

Further, in the above described embodiment, the interlocking mechanism 50 is provided for slightly opening the recording sheet cover 2 in response to the opening movement of the panel cover 3. Therefore, open phase of the panel cover 3 can be detected by the detection mechanism 170 which detects open phase of the recording sheet cover 2. Accordingly, a separate detection mechanism for detecting open phase of the panel cover can be dispensed with. Further, the detecting devices 170 are of simple construction which do not require high production cost. For example, since the reflection type sensors are directly attached to the control boards, it is unnecessary to provide a substrate exclusively used for the sensor and a harness which connects the exclusive substrate to a control board, which, in turn, can reduce production cost.

While the invention has been described in detail and with reference to specific embodiments thereof, it would be apparent to those skilled in the art that various changes and modifications may be made therein without departing from the spirit and scope of the invention. For example, in the above embodiment, the regulation member 105 or 178 is provided integrally with the reflection plate 104 or 173 provided to the actuator 103 or 174. However, the regulation member can be provided to the control board such that the regulation member protrudes upwardly from the control board to contact the reflection plate. Further, the distance between the reflection plate and the reflection type sensor is easily controllable by changing the extension length of the regulation member. Moreover, the detection device can be used for detecting cut recording sheet 5, or for detecting sheet jamming. In the latter case, if a sheet 7 does not reach the free end of the actuator arm 103B within a predetermined period counting from rotation start timing of the sheet feed roller 61, determination falls sheet jamming so as to render the facsimile machine inoperative. Furthermore, in the above described embodiment, the first and second reflection type sensors 101 and 171 are positioned on the identical control board 102. However, separate control boards can be provided for each of the reflection type sensors.

What is claimed is:

1. A detection device for detecting a state or a phase of an article to be detected in an image forming apparatus having a main frame, the detection device comprising:

a reflection type sensor having a light emitting portion and a light receiving portion, the sensor generating a detection signal upon receiving light in the light receiving portion;

a control board having control elements into which the detection signal is input;

an actuator movably supported by the main frame and having one end abuttable against the article to be detected and having another end, the movement of the actuator being determinative by the abutment of the one end against the article;

a reflection member provided at the other end of the actuator, the reflection member being movable toward and away from the reflection type sensor in accordance with the movement of the actuator; and a regulation member provided for providing a regulated distance between the reflection type sensor and the reflection member when the reflection member is moved to the vicinity of the reflection type sensor;

wherein the reflection type sensor is mounted on the control board, and wherein the regulation member is provided integrally with the reflection member and extends therefrom, the regulation member having a free end contactable with the control board when the reflection member is moved to the vicinity of the reflection type sensor, whereby the regulated distance is provided between the reflection type sensor and the reflection member.

2. The detection device as claimed in claim 1, wherein the free end of the regulation member has a rounded shape.

3. The detection device as claimed in claim 1, wherein the actuator comprises:

a shaft portion having both axial end portions;

a first arm extending from the shaft portion and having a free end abuttable on the article to be detected;

a second arm extending from the shaft portion and having a free end to which the reflection member is provided.

4. The detection device as claimed in claim 3, further comprising an attachment member supported to the main frame, the attachment member having a lower end formed with a lip portion, and wherein each axial end portions has a U-shaped portion resiliently deformable capable of allowing the U shaped portions to pass through the lip portion for rotatably suspending the shaft portion from the attachment member.

5. The detection device as claimed in claim 4, wherein the article to be detected is a sheet medium.

6. The detection device as claimed in claim 4, wherein the image forming apparatus includes a cover member which can be opened or closed, and wherein the article to be detected is the cover member.

7. An image forming apparatus comprising:

a main frame defining an original sheet path;

an original sheet feeding mechanism comprising an original sheet feed roller;

a detection device provided in the main frame for detecting the original sheet when the original sheet runs on the original sheet path, the detection device comprising:

a reflection type sensor having a light emitting portion and a light receiving portion, the sensor generating a detection signal upon receiving light in the light receiving portion;

a control board having control elements into which the detection signal is input;

an actuator movably supported by the main frame and having one end abuttable against the original sheet and having another end, the movement of the actuator being determinative by the abutment of the one end against the original sheet;

a reflection member provided at the other end of the actuator, the reflection member being movable toward and away from the reflection type sensor in accordance with the movement of the actuator; and a regulation member provided for providing a regulated distance between the reflection type sensor and the reflection member when the reflection member is moved to the vicinity of the reflection type sensor;

wherein the reflection type sensor is mounted on the control board, and wherein the regulation member is provided integrally with the reflection member and extends therefrom, the regulation member having a free end contactable with the control board when the reflection member is moved to the vicinity of the reflection type sensor, whereby the regulated distance is provided between the reflection type sensor and the reflection member.

8. The image forming apparatus as claimed in claim 7, wherein the free end of the regulation member has a rounded shape.

9. The image forming apparatus as claimed in claim 7, wherein the actuator comprises:

a shaft portion having both axial end portions;

a first arm extending from the shaft portion and having a free end protrudable into the original sheet path;

a second arm extending from the shaft portion and having a free end to which the reflection member is provided.

10. The image forming apparatus as claimed in claim 9, further comprising an attachment member supported to the main frame, the attachment member having a lower end formed with a lip portion, and wherein each axial end portions has a U-shaped portion resiliently deformable capable of allowing the U shaped portions to pass through the lip portion for rotatably suspending the shaft portion to the attachment member.

11. The image forming apparatus as claimed in claim 10, wherein the main frame has an upper opening, and further comprising:

a recording sheet cover provided at a rear half portion of the upper opening for opening and closing the rear half portion;

a panel cover provided at a front half portion of the upper opening for opening and closing the front half portion;

a second detection device provided in the main frame for detecting opening state of the recording sheet cover; and an interlocking mechanism provided between the panel cover and the recording sheet cover for slightly opening the recording sheet cover from a closing state thereof in response to opening movement of the panel cover from closing state thereof.

12. The image forming apparatus as claimed in claim 11, wherein the second detection device comprises a second reflection type sensor having a second light emitting portion and a second light receiving portion, the second sensor generating a second detection signal upon receiving light in the second light receiving portion;

a second control board having control elements into which the second detection signal is input, the second reflection type sensor being mounted on the second control board;

a second actuator movably supported by the main frame and having one end abuttable against the recording sheet cover and having another end, the movement of the actuator being determinative by the abutment of the one end against the recording sheet cover;

a reflection member provided at the other end of the actuator, the reflection member being movable toward and away from the reflection type sensor in accordance with the movement of the actuator; and a regulation member provided to the reflection member and contactable with the control board when the reflection member is moved to the vicinity of the reflection type sensor.

13. An image forming apparatus comprising:

a main frame having an upper opening;

a recording sheet cover provided at a rear half portion of the upper opening for opening and closing the rear half portion, the recording sheet cover has a front free end portion and a rear pivot portion;

a panel cover provided at a front half portion of the upper opening for opening and closing the front half portion, the panel cover has a front free end portion and a rear pivot portion positioned in confrontation with the front free end portion of the recording sheet cover;

a detection device provided in the main frame for detecting opening state of the recording sheet cover, the detection device including a reflection type sensor provided at the main frame and having a light emitting portion and a light receiving portion, an operation piece fixed to the recording sheet cover, an actuator pivotally supported to the main frame and movable in response to the movement of the operation piece, and a detected portion provided at the actuator and detected by the reflection type sensor, the detected portion being movable between a detected position and a non-detected position, the detected position being defined upon opening of the recording sheet cover; and an interlocking mechanism provided between the panel cover and the recording sheet cover for slightly opening the recording sheet cover from a closing state thereof in response to opening movement of the panel cover from closing state thereof, the interlocking mechanism including an engagement projection extending rearwardly from the rear pivot portion of the panel cover, a driven portion provided at the free end portion of the recording sheet cover, the engagement projection being engageable with the driven portion and urging the driven portion upwardly at an initial opening phase of the panel cover.

14. The image forming apparatus as claimed in claim 13, wherein the front free end portion of the recording sheet cover has inverted U-shape side walls each having top wall and front end face and wherein the engagement projection comprises a first pair of projections having a triangular shape whose apex is directed rearwardly, and a second pair of projections having elongated shape and slantingly downwardly extending rearwardly in flush with an upper surface of the first pair of projections, the second pair of projections being positioned in spaces defined by the inverted U-shape side walls; and wherein the driven portion comprises a first pair of driven surfaces provided at the front end face of the inverted U-shaped side walls, and a second pair of driven surfaces provided at lower edgeline of the top walls of the inverted U-shaped side walls, the first pair of engagement projections being engageable with the first pair of driven surfaces and the second pair of engagement projections being engageable with the second pair of driven surfaces.

15. A detection device for detecting a state or a phase of an article to be detected in an image forming apparatus having a main frame, the detection device comprising:

a reflection type sensor having a light emitting portion and a light receiving portion, the sensor generating a detection signal upon receiving light in the light receiving portion;

a control board having control elements into which the detection signal is input;

an actuator movably supported by the main frame and having one end abuttable against the article to be detected and having another end, the movement of the actuator being determinative by the abutment of the one end against the article;

a reflection member provided at the other end of the actuator, the reflection member being movable toward and away from the reflection type sensor in accordance with the movement of the actuator; and a regulation member provided for providing a regulated distance between the reflection type sensor and the reflection member when the reflection member is moved to the vicinity of the reflection type sensor, the regulation member being disposed at the other end of the actuator.

16. An image forming apparatus comprising:

a main frame defining an original sheet path;

an original sheet feeding mechanism comprising an original sheet feed roller;

a detection device provided in the main frame for detecting the original sheet when the original sheet runs on the original sheet path, the detection device comprising:

a reflection type sensor having a light emitting portion and a light receiving portion, the sensor generating a detection signal upon receiving light in the light receiving portion;

a control board having control elements into which the detection signal is input;

an actuator movably supported by the main frame and having one end abuttable against the original sheet and having another end, the movement of the actuator being determinative by the abutment of the one end against the original sheet;

a reflection member provided at the other end of the actuator, reflection member being movable toward and away from the reflection type sensor in accordance with the movement of the actuator; and a regulation member provided for providing a regulated distance between the reflection type sensor and the reflection member when the reflection member is moved to the vicinity of the reflection type sensor, the regulation member being disposed at the other end of the actuator.

17. An image forming apparatus comprising:

a main frame having an upper opening;

a recording sheet cover provided at a rear half portion of the upper opening for opening and closing the rear half portion, the recording sheet cover including a side wall, the side wall having a pair of opposing side surfaces and an upper surface;

a panel cover provided at a front half portion of the upper opening for opening and closing the front half portion;

a detection device provided in the main frame for detecting opening state of the recording sheet cover; and an interlocking mechanism including an engagement projection extending from the panel cover, whereby opening the panel cover causes the engagement projection to contact the upper surface of the side wall of the recording sheet cover and to thereby open the recording sheet cover.

* * * * *